(12) United States Patent
Ottesen et al.

(10) Patent No.: US 6,717,763 B2
(45) Date of Patent: Apr. 6, 2004

(54) POWER SAVINGS METHOD AND APPARATUS FOR DISK DRIVES

(75) Inventors: Hal Hjalmar Ottesen, Rochester, MN (US); Gordon James Smith, Rochester, MN (US)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 348 days.

(21) Appl. No.: 09/859,622

(22) Filed: May 16, 2001

(65) Prior Publication Data

US 2002/0171966 A1 Nov. 21, 2002

(51) Int. Cl.[7] .......................... G11B 21/02; G11B 15/18
(52) U.S. Cl. ................... 360/75; 360/69; 360/78.04; 360/78.06
(58) Field of Search .................. 360/75, 69, 78.04, 360/78.06, 78.08, 73.03

(56) References Cited

U.S. PATENT DOCUMENTS

| | | | |
|---|---|---|---|
| 5,377,058 A | 12/1994 | Good et al. | 360/75 |
| 5,412,519 A | 5/1995 | Buettner et al. | 360/73.03 |
| 5,914,581 A * | 6/1999 | Suzuki et al. | 318/798 |
| 6,285,521 B1 * | 9/2001 | Hussein | 360/73.03 |

FOREIGN PATENT DOCUMENTS

JP          62-129971        6/1987        ........... G11B/19/20

OTHER PUBLICATIONS

IBM Corp., "Quick Standby and Resume," IBM Technical Disclosure Bulletin, vol. 40, No. 08, pp. 121–122 (Aug. 1997).

* cited by examiner

*Primary Examiner*—David Hudspeth
*Assistant Examiner*—Mitchell Slavitt
(74) *Attorney, Agent, or Firm*—Patrick G. Bilig

(57) ABSTRACT

A disk drive includes at least one disk having a disk surface and at least one transducer head for writing and/or reading data from the disk surface. The disk drive performs a power-saving idle operation including reducing a rotational speed of the disk, and continuously moving the transducer head at varying radial velocity components relative to the disk surface in a repeating sweeping pattern between a selected inner disk diameter and a selected outer disk diameter. The radial velocity components are varied as a function of the transducer head's radial position in relation to the disk surface, such as with a radial velocity idle sweep profile representing a relationship between the radial velocity component of the transducer head and its radial location relative to the disk surface that optimizes head-disk interaction (HDI) when the disk is rotating at a given reduced rotational speed.

20 Claims, 6 Drawing Sheets

POWER SAVINGS METHOD AND APPARATUS FOR DISK DRIVES

THE FIELD OF THE INVENTION

The present invention relates generally to disk drives, and more particularly, to disk drives having a transducer head which is separated from a storage medium by a fluid film, such as air, when the storage medium is moving at an operational rotational speed, wherein the storage medium has a reduced rotational speed in a low power mode.

BACKGROUND OF THE INVENTION

Most disk drive data storage devices experience prolonged periods of data read/write inactivity. This is particularly true for disk drives that run continuously overnight or during holidays. Maintaining standby operations is a waste of energy especially where the power system of the disk drive is powered from a limited power source, such as batteries of a portable device, or where heat dissipation is a problem. As microcomputer based systems employing disk drives become ever-present in the work place and are often continuously operational, such systems must comply with standards requiring lower power consumption. Completely powering down the disk drive to reduce power consumption requires a relatively long wait time after the disk drive is powered back up for the disk drive to become ready to read or write data. Moreover, frequent power on and off cycles result in increased wear and possible high stiction events between the disk storage media and transducer head of the disk drive that reduce the useful life of the disk drive. Thus, during idle periods it is desirable to reduce power consumption while maintaining a near operational status of the disk drive.

During idle periods, principal power consumption in the disk drive is from the spindle motor maintaining the rotational speed of the disk media. Therefore, to conserve energy during idle periods, conventional power-saving techniques reduce spindle motor current which accordingly reduces the rotational speed of the disk media. However, reducing the rotational speed of the disk media can increase the risk of potentially damaging contact between the transducer heads and the disk media surface. Furthermore, a reduction in disk media rotational speed also typically disrupts the disk drive's servo system, which otherwise maintains disk rotational speed at a near constant speed and provides information regarding the location of the transducer heads relative to the disk media.

To overcome these potential problems, conventional power saving techniques typically, prior to reducing disk rotational speed, either "park" the transducer heads at an off-disk location or move the transducer heads to an above-disk location providing the maximum transducer-to-disk clearance. However, each "parking" operation causes wear on the transducer assembly and slows initial post-idle seek times required to be ready to read or write data. Furthermore, repeated and prolonged operation with the transducer heads above a single disk track ultimately results in burnishing of both the transducer heads and the disk surface.

Thus, there is a need for a disk drive system having a low power mode of operation wherein the rotational speed of the disk media is reduced without compromising the mechanical integrity of the disk media or the transducer head.

SUMMARY OF THE INVENTION

One aspect of the present invention provides a disk drive and a method of performing a power-saving idle operation in a disk drive. The disk drive includes at least one disk having a disk surface and at least one transducer head for writing and/or reading data from the disk surface. A spindle motor is coupled to the disk to rotate the disk. A voice coil motor is coupled to the transducer head to provide a radial velocity component to the transducer head to radially position the transducer head relative to the disk surface. A programmable controller performs the power-saving idle operation which controls the spindle motor to reduce spindle motor current to thereby slow disk rotation. The power-saving idle operation also controls the voice coil motor to vary voice coil motor current to thereby continuously move the transducer head radially relative to the disk surface in a repeating sweeping pattern between a selected inner disk diameter and a selected outer disk diameter. The varying voice coil motor current is a function of the transducer head's radial position in relation to the disk surface.

In one embodiment, power-saving idle operation controls the voice coil motor to vary the voice coil motor current to thereby vary the radial velocity component of the transducer head. In one embodiment, the power-save idle operation controls the voice coil motor to vary the radial velocity component of the transducer head based on a radial velocity idle sweep profile representing a relationship between the radial velocity component of the transducer head and its radial location relative to the disk surface that optimizes head-disk interaction (HDI) when the disk is rotating at a given reduced rotational speed. In one embodiment, the programmable controller includes memory storing at least one look-up table containing optimal radial velocity idle sweep profiles. In one embodiment, the power-save idle operation estimates and corrects achieved radial velocity component of the transducer head versus voice coil motor current.

In one embodiment, the programmable controller determines the transducer head's radial position in relation to the disk surface based on sensing when the transducer head reaches the selected inner disk diameter and the selected outer disk diameter. For example, in one embodiment, the programmable controller senses when the transducer head reaches the selected inner disk diameter based on reaching an inner diameter crash stop and senses when the transducer head reaches the selected outer disk diameter based on a read signal from the transducer head disappearing when the transducer head reaches the selected outer disk diameter.

In one embodiment, the selected inner disk diameter is an inner most disk diameter and the selected outer disk diameter is an outer most disk diameter. In another embodiment, the selected inner and outer disk diameters are selected to prevent the transducer head from traversing a disk area where vital data is stored. In another embodiment, the selected inner and outer disk diameters are selected to prevent the transducer head from traversing disk areas where a flying height of the transducer head from the disk surface is lowest.

In one embodiment, the power-save idle operation controls the spindle motor to slow disk rotation to a first reduced disk rotational speed based on not receiving a command within a first time period. In one embodiment, the power-save idle operation controls the spindle motor to further slow disk rotation to a second reduced disk rotational speed based on not receiving a command within a second time period.

The power-saving idle operation of the disk drive according to the present invention can reduce the potential for damaging transducer head-disk interference and also can reduce the mechanical wear on the transducer heads during power-saving idle periods by maintaining the transducer heads in a constant sweeping motion relative to the disk surface and by reducing and/or eliminating transducer head traversing of selected disk diameters. The power-saving idle technique of the present invention can also retrieve data more quickly when returning to seek mode from idle mode than other conventional power saving idle techniques. Moreover, the power-saving idle technique of the present invention can be practiced in existing disk drives without modification to the existing servo system.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
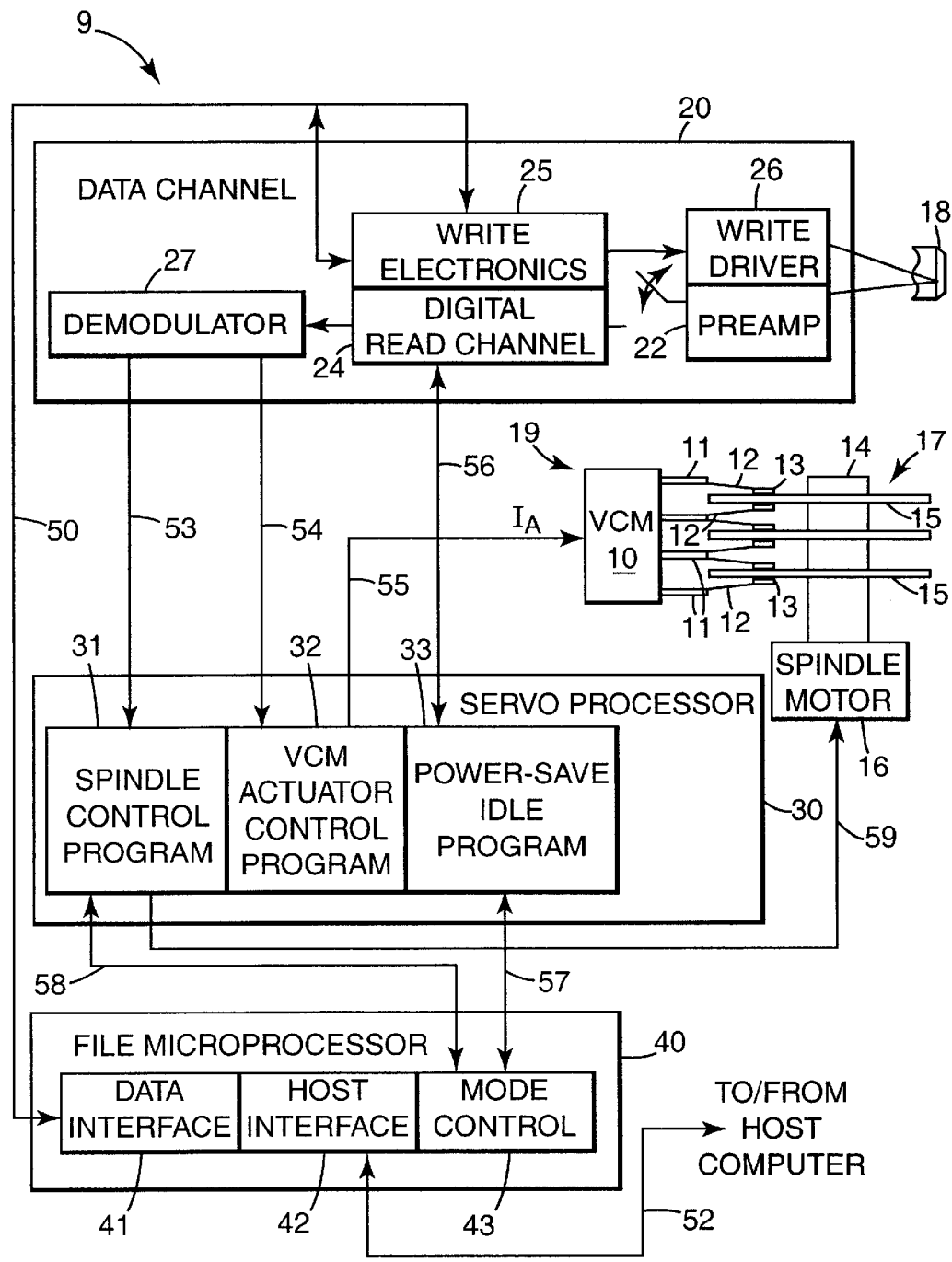
FIG. 1 is a block and schematic diagram illustrating one embodiment of a disk drive according to the present invention.

One embodiment of a disk drive is generally illustrated at 9 in FIG. 1. Disk drive 9 includes an actuator assembly 19 having a voice coil motor (VCM) 10, attached arms 11, and suspensions 12. Transducer heads 13 are disposed at the end of suspensions 12. A spindle assembly 17 includes a hub 14, rigid disks 15, and a spindle motor 16. The transducer heads 13 "fly" on both the top and bottom surfaces of disks 15 as they read and/or write data on magnetic material deposited on the surfaces of the disks. The transducer heads 13 fly over or under the confronting disk surface, supported by a bearing or film of fluid, such as air, induced between the disk and the head in response to the high-speed rotation of the disk. In this regard, for clarity, the below described embodiments refer to transducer heads "above" the disk surfaces, which herein means "above or below" the disk surfaces, and refer to the transducer heads flying "over" the disk surfaces, which herein means "over or under" the disk surfaces.

An electromagnetic transducer 18 supported by each transducer head 13 is connected to a data channel 20. Read and write electronics portions of the data channel 20 are connected to an individual transducer head 13 by conventional means (not shown), such as a flexible cable. As a disk 15 rotates adjacent to an individual transducer head 13, a continuous signal is read from a track on the surface of the disk by electromagnetic detection in the head transducer 18 and then is amplified using a preamplifier 22. The output of preamplifier 22 is sampled and fed to a digital read channel 24, which filter and equalize the amplified signal and which typically employ a specific detection procedure to detect data in the amplified, processed signal. Digital read channel 24 may also include clocking circuits to extract a data clock.

Data channel 20 also includes write electronics 25 which may precondition a signal to be written on a disk track. Write electronics 25 provide the signal which is to be recorded to a write driver 26 that is conventionally connected to a head transducer 18 for writing onto a disk track. In one embodiment employing an inductive head, a single transducer is used for both read and write functions. In another embodiment employing a magneto resistive head, separate transducers are used for reading and writing data.

Disk drive 9 also contains processing components, including a servo processor 30 and a file microprocessor 40. Conventionally, servo processor 30 may include an invokable application run on a separate microprocessor or file microprocessor 40. In the embodiment illustrated in FIG. 1, servo processor 30 includes a spindle control program 31 and a VCM actuator control program 32. Servo processor 30 controls the positioning of the actuator assembly 19, including VCM 10, arms 11, and suspensions 12, to position the transducer heads 13 at fixed radial locations over the surfaces of disks 15. The positioning functions of the VCM actuator control program 32, include moving heads 13 to an addressed concentric track during a track seeking operation and maintaining the heads in alignment with a selected track during a track following operation. Both the track seeking and track following operations typically employ servo signals written continuously on a dedicated disk surface or into dedicated servo sectors on each of the disk surfaces. These servo signals are respectively read by one or all of the heads 13 and fed back to servo processor 30 through digital read channel 24 and demodulator 27. The VCM actuator control program 32 functions to move a head 13 to a desired track location and to cause the head to remain aligned with or follow the selected track by reduction of position error. The trajectory of the transducer heads 13 forms an arc. The velocity along the arc has both radial and tangential velocity components relative to the track. The VCM actuator control program 32 implements track following, track seeking, head registration, and head parking functions, which are well understood by those of ordinary skill in the art.

In the embodiment illustrated in FIG. 1, file microprocessor 40 includes a data interface section 41 which performs interface functions, including encoding and decoding of data to be written to and read from a disk; a host interface section 42 for providing control and data information to and receiving commands and data from a host computer (not shown); and a mode control section 43 for establishing a changing modes or microprocessor operation.

In one embodiment, servo processor 30 includes a power-saving idle program 33 according to the present invention. However, the power-saving idle program 33 can be stored according to design conditions in any of the microprocessor resources of the disk drive 9, such as memory contained in file microprocessor 40 or a separate microprocessor, or other memory separate from file microprocessor 40 and servo processor 30.

The major interconnections between the components of disk drive 9 illustrated in FIG. 1 include a data signal path 50 between the data interface section 41 of file microprocessor 40 and the read and write electronics 24 and 25 of data channel 20. A command/data signal path 52 connects disk drive 9 of FIG. 1 through its host interface 42 with a host computer (not shown). Demodulated servo signals are provided to the spindle control program 31 and VCM actuator control program 32, respectively, from demodulator 27 over signal paths 53 and 54. A signal path 55 conducts a servo control signal from the VCM actuator control program 32 to VCM 10. A signal path 59 conducts a spindle motor speed control signal from the spindle control program 31 to spindle motor 16. A signal path 56 connects the digital read channel electronics 24 with the power-saving idle program 33 and conducts a signal to the power-saving idle program 33 indicating the radial position of heads 13 relative to the surfaces of disks 15. Once disk drive 9 has exceeded a period of data read/write inactivity, mode control 43 provides an appropriate control signal via signal path 57 to enable power-saving idle program 33. Mode control 43 communicates with the spindle control program 31 via signed path 58.

The below described power-saving techniques according to the present invention are designed to decrease disk drive 9 power consumption during idle times by reducing the rotational speed of disks 15. While conventional power-savings techniques also utilize disk speed reduction to reduce energy consumption during idle times, the conventional power-saving techniques do so at the expense of the mechanical reliability of the disk drive, particularly that of the transducer heads and disk surfaces. The below described power-saving techniques according to the present invention reduce disk rotational speed during idle times without compromising the mechanical integrity of the disk drive.

Transducer heads are designed to fly at a height that is incrementally above the highest point on a disk's surface. Transducer head designs vary depending on which operating characteristics are sought to be optimized. For example, some transducer head designs are based on maximizing flying height at a disk's outer diameters, while other designs are based on maximizing flying heights at a disk's inner diameters. Regardless of design, a transducer head's flying height above the disk surface is, in part, dependent on the associated disk's rotational speed.

Figure 2:
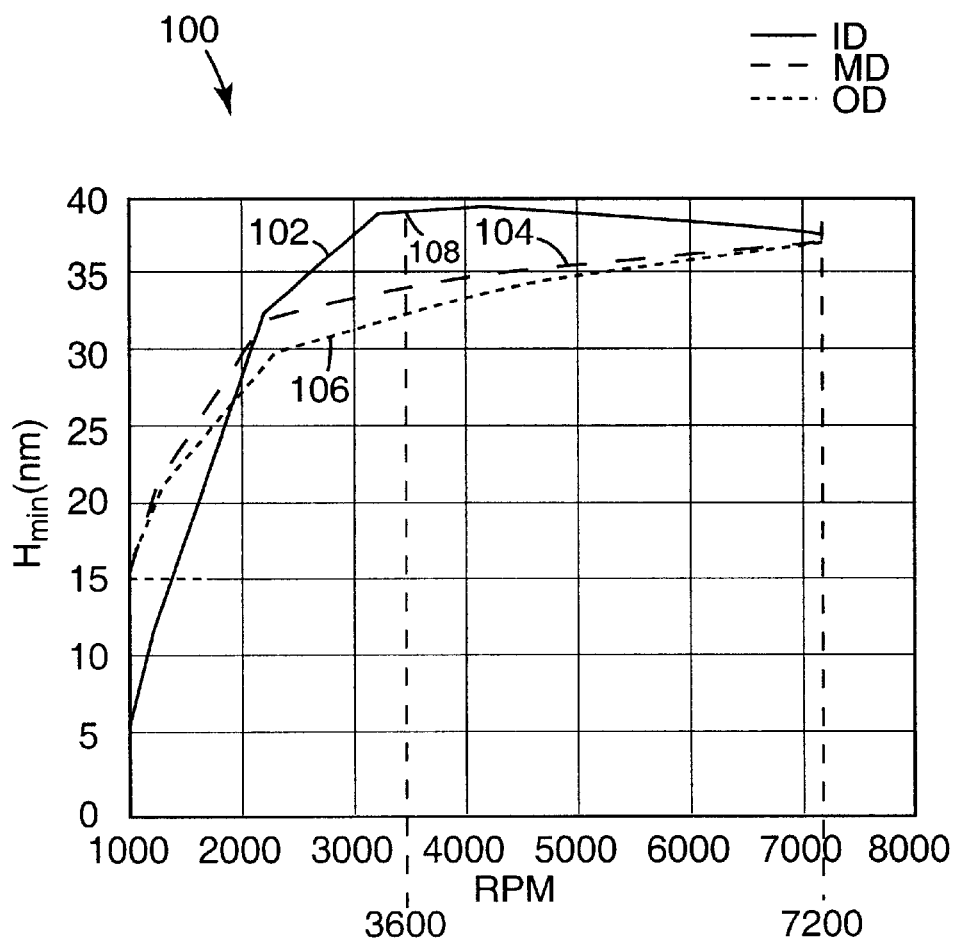
FIG. 2 is a graph illustrating the minimum flying height versus disk rotational speed for a negative pressure bob sled (NPBS) transducer design.

FIG. 2 illustrates a graph 100 of minimum transducer flying heights in nanometers (nm) versus disk rotation speeds in revolutions per minute (RPM) over various regions of a disk for an example negative pressure bobsled (NPBS) airbearing type transducer head. Curve 102 represents the minimum fly height over the inner disk diameters, curve 104 represents the minimum fly height over the middle disk diameters, and curve 106 represents the minimum fly height over the outer disk diameters.

To conserve energy, the power-saving technique according to present invention reduces current to spindle motor 16, resulting in a slowing of the rotational speed of disks 15. However, as FIG. 2 illustrates, a reduction in disk rotational speed also results in a corresponding reduction in the flying height of an example NPBS type transducer head over various regions of the disk surface. A reduction in flying height, in turn, can increase the likelihood of head-disk interaction (HDI). HDI occurs whenever transducer heads 13 make contact with the magnetic material deposited on the surface of disks 15, and can result in damage to both the transducer heads and the disk surface.

HDI damage potential can be expressed by the following Equation I:

$$HDI = KV^2/FH \quad \text{Equation I}$$

where K is a constant;
V is the disk velocity; and
FH is the minimum flying height.

As illustrated by curves 104 and 106, a reduction in disk rotational speed reduces the flying height over both the middle and outer disk diameters, which can result in an increased potential for HDI. However, a reduction in disk rotational speed can sometimes result in an increase in fly height. As curve 102 illustrates, a 50% reduction in disk rotational speed from 7200 RPM to 3600 RPM actually produces an increase in flying height 108 over the inner disk diameters 102. Applying the above Equation I, a 50% reduction in disk velocity reduces the HDI damage potential by factor of four at the lower rotational speed. The small increase in flying height further decreases the HDI damage potential.

As discussed in the Background of the Invention section of the present specification, one conventional power-saving technique employing reduced disk speed during idle periods eliminates the potential for HDI by "unloading" the transducer heads. In an unloading procedure, the transducer heads are moved to an off-disk location and parked. However, each unloading procedure causes wear on the transducer heads and also increases initial post-idle seek times required to be ready to read or write data. A second conventional power-saving technique discussed in the Background of the Invention section attempts to lessen HDI potential by moving the transducer heads to a location over the disk surface where the flying height is the greatest at the particular reduced disk rotational speed, such as over the inner disk diameters when the disk is at 3600 RPM, as indicated at point 108 on curve 102. However, even with the transducer heads at the maximum flying height for a particular disk rotational speed, repeated and prolonged periods with the transducer heads over a single data track on a spinning disk eventually leads to burnishing of both the disk surface and the transducer heads.

The power-saving techniques according to present invention substantially eliminate the problems associated with each of the above conventional power-saving techniques by continuously maintaining the transducer heads in a sweeping motion above the disk surface after the disk rotational speed has been reduced. Once the disk rotational speed has been reduced, the transducer heads are moved continuously in a repeating sweeping pattern between a selected inner disk diameter and a selected outer disk diameter. Furthermore, as the transducer heads traverse the distance between the selected inner and outer diameters, the radial velocity component of the transducer heads is varied. As the transducer heads pass over areas where the fly height is lower, the transducer heads' radial velocity component is increased. Conversely, as the transducer heads pass over areas where the flying height is higher, the transducer heads' radial velocity component is decreased. As a result, the transducer heads spend less time over those disk radii where the fly height is lower and more time over those disk radii where the fly height is higher. By varying the transducer heads' radial velocity component in this manner, the overall potential for HDI as the transducer heads pass over the disk surface is minimized.

The relationship between the radial velocity component of the transducer head and its radial location relative to the disk that optimizes HDI when the disk is rotating at a given reduced rotational speed is herein referred to as its radial velocity idle sweep profile. As mentioned above, the relationship between the transducer head flying height and the angular velocity of the disk varies between transducer head designs, such as the example NPBS airbearing type transducer head design illustrated in FIG. 2. Thus, the radial velocity idle sweep profiles accordingly also vary between differently designed transducer heads, as illustrated by FIG. 3 and FIG. 4 and as described below.

Figure 3:
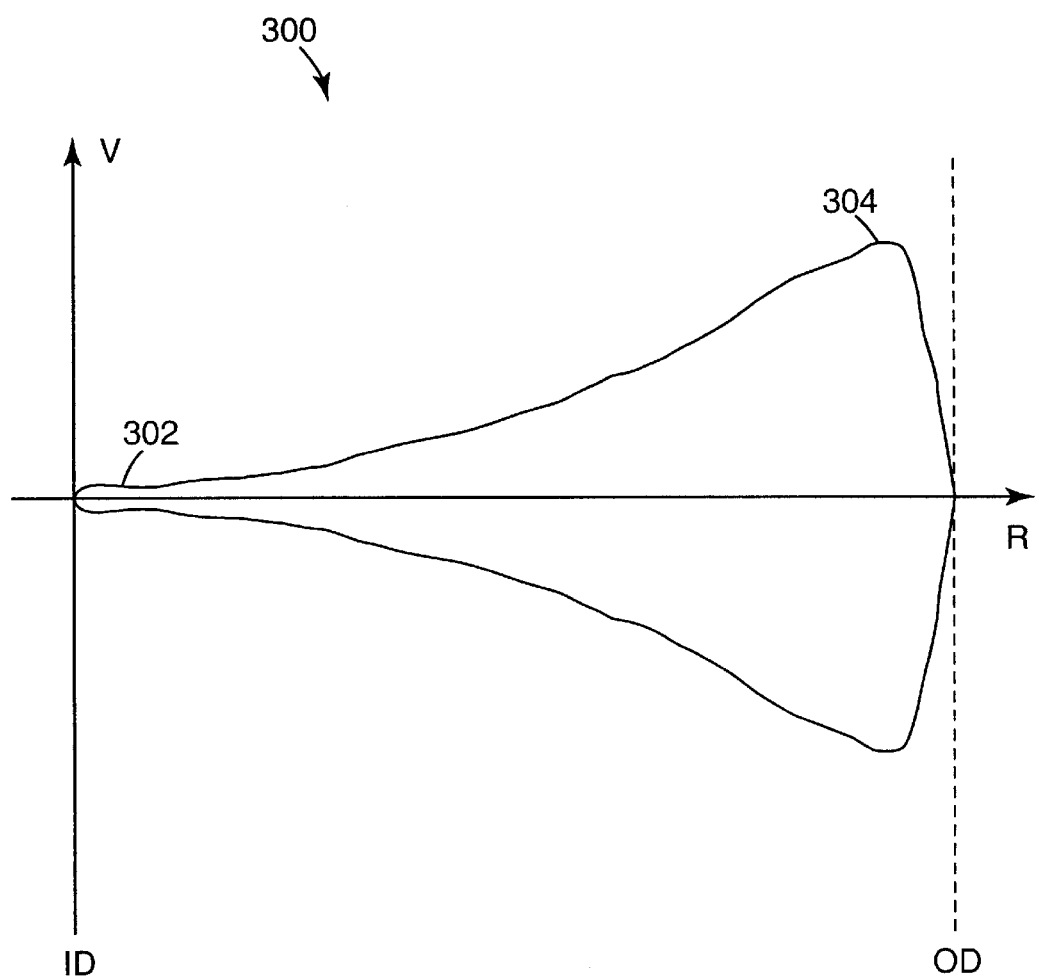
FIG. 3 is a graph illustrating an example of an appropriate radial velocity profile for an NPBS airbearing.

FIG. 3 illustrates an example of a radial velocity idle sweep profile 300 for an NPSB type airbearing. For this type of head design, the fly height is higher at inner disk diameters and lower at outer disk diameters. Thus, to reduce HDI during idle times, the radial velocity component of the transducer head is reduced when passing over a disk's inner diameters as indicated at 302, and increased as it passes over a disk's outer diameters as indicated at 304.

Figure 4:
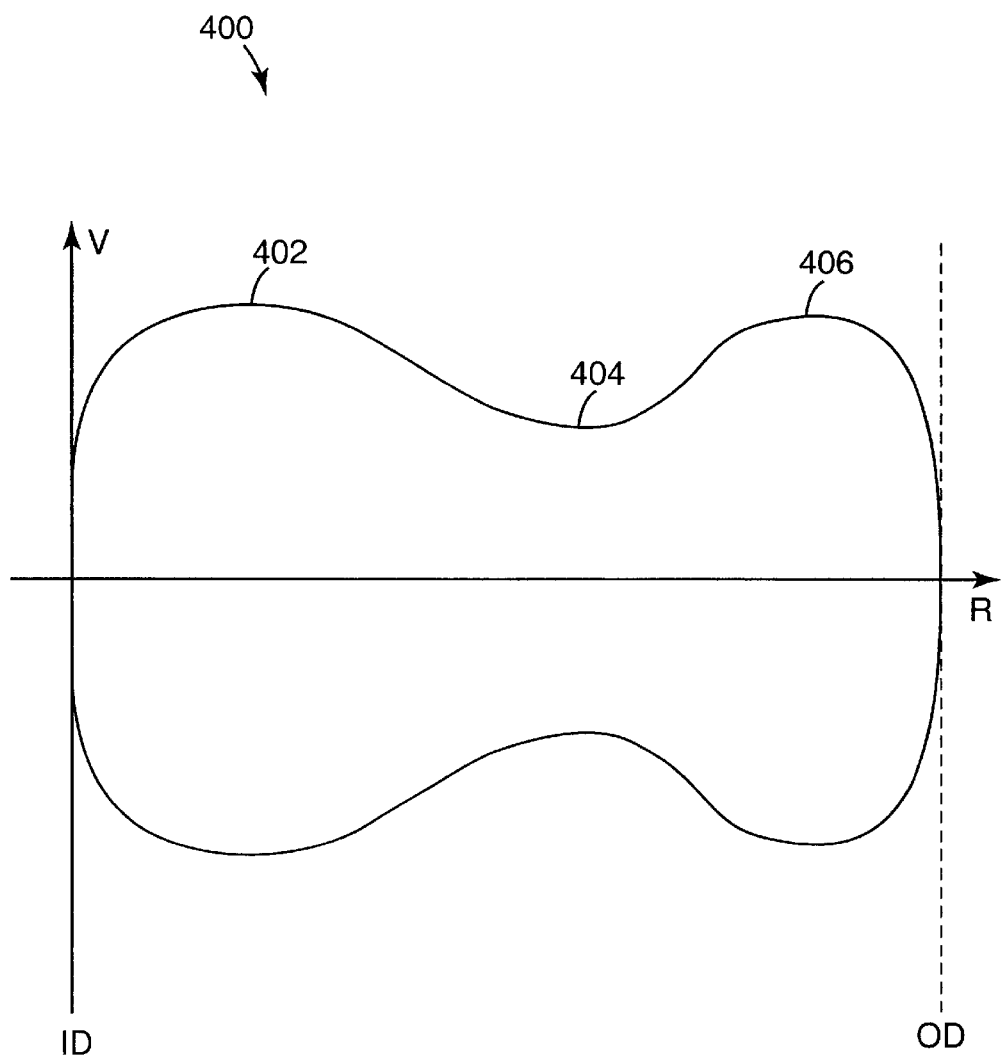
FIG. 4 is a graph illustrating an example of an appropriate radial velocity profile for a transducer head designed to fly highest at middle disk diameters.

FIG. 4 illustrates an example of a radial velocity idle sweep profile 400 for a transducer head designed to fly highest over a disk's middle diameters. Thus, to reduce HDI during idle times, the radial velocity component of the transducer head is increased as it passes over the disk's inner diameters as indicated at 402, decreased as it passes over the disk's middle diameters as indicated at 404, and increased again as it passes over the disk's outer diameters as indicated at 406.

Additionally, depending on the particular disk characteristics, inner and outer disk diameters can be selected to further reduce HDI potential. In a first example scenario, the selected outer diameter is the outermost disk diameter while the selected inner diameter is the innermost disk diameter. Thus, in this first example scenario, the transducer head traverses back and forth in a sweeping motion above the entire disk surface during an idle power-saving operation. In a second example scenario, the inner and outer diameters are selected to prevent the transducer heads from passing over a disk area where vital data is stored. In a third example scenario, the inner and outer diameters are selected to prevent the transducer head from traversing areas where the flying height is lowest.

For a given disk drive 9, the particular type of transducer head 13 and the drive's particular disk diameters where critical data storage occurs are known parameters of the disk drive design. In one embodiment, for any particular disk/transducer head combination, the optimal radial velocity idle sweep profiles for the transducer head at various disk 15 rotational speeds are contained in look-up tables stored in memory in server processor 30 or any of the microprocessor resources of disk drive 9, such as memory contained in file microprocessor 40 or a separate microprocessor, or other memory separate from microprocessor 40 and servo processor 30. The look-up tables contain various profiles of current values ($I_A$) that when applied on line 55 to VCM 10 produce the optimal transducer head 13 radial velocity idle sweep profile associated with that particular disk idle speed. For later reference, note that for each radial velocity idle sweep profile there is an associated average radial velocity component of the transducer head as it sweeps above the disk surface.

Figure 5:
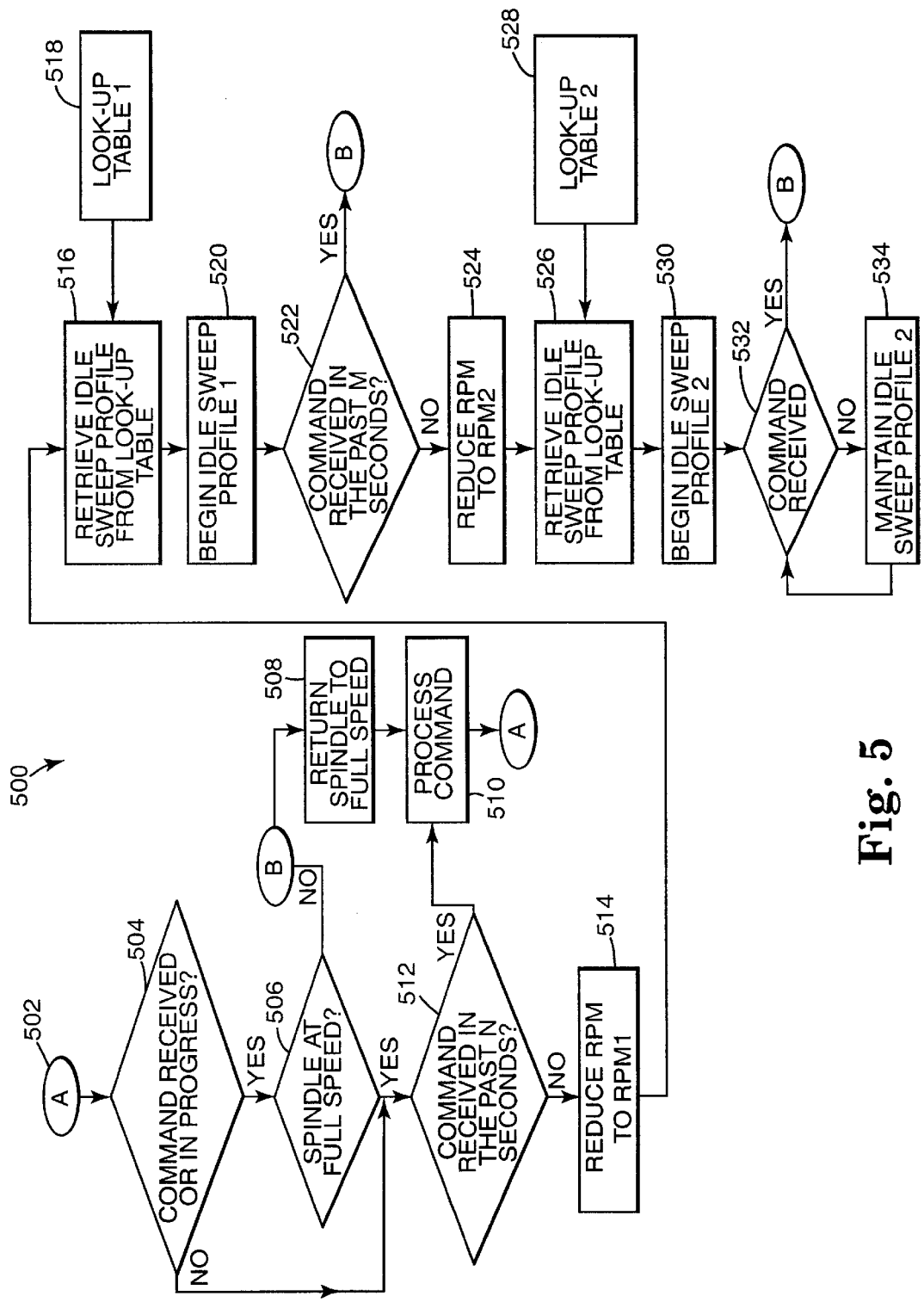
FIG. 5 is a flow diagram illustrating a process for initiating and executing a two-step low power mode for a disk drive.
Figure 6:
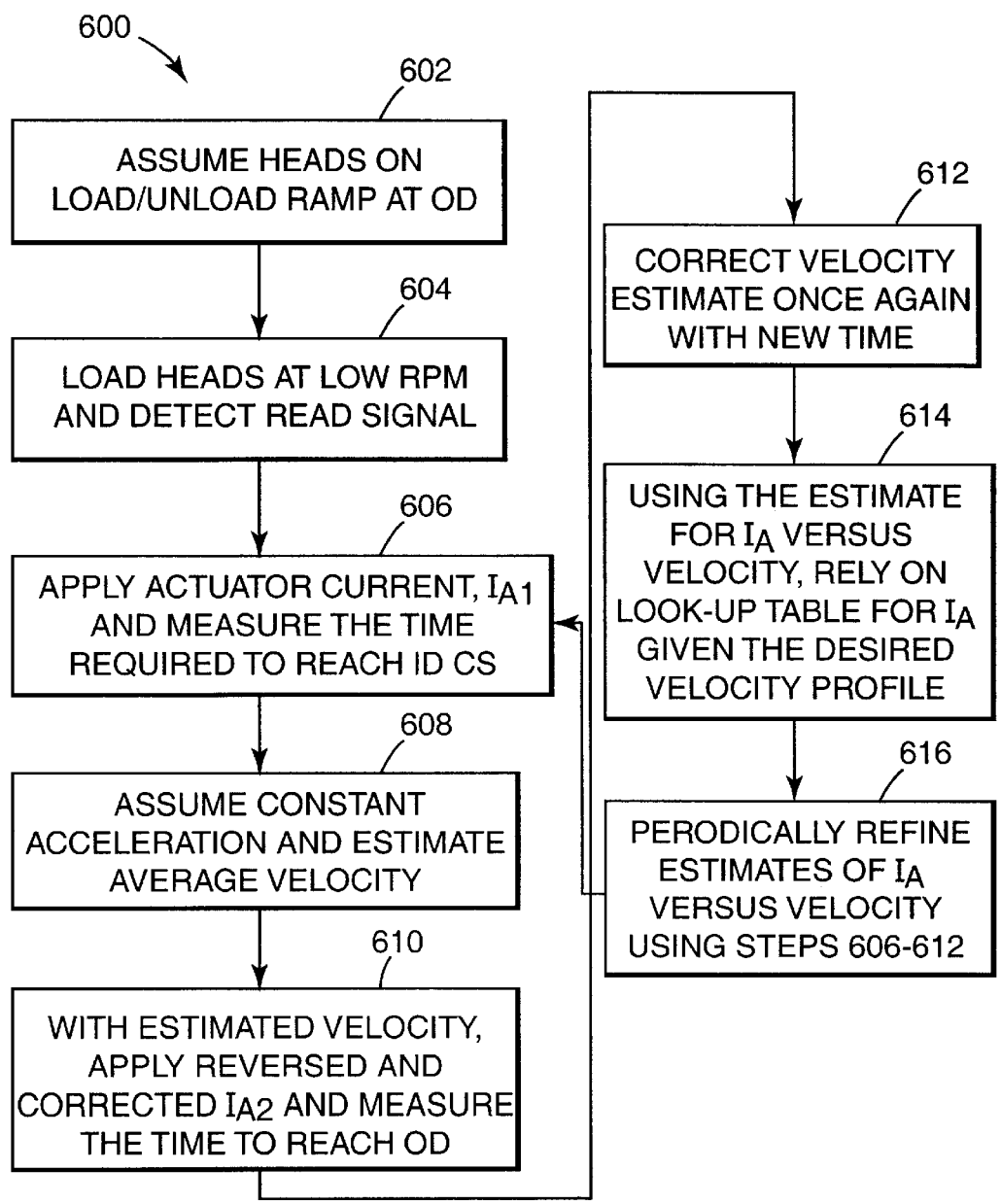
FIG. 6 is a flow diagram illustrating a process for initiating and executing and inner-to-outer diameter sweep during a low power mode for a disk drive.

One embodiment of a power-saving idle operation according to the present invention is controlled by a process 500 and a process 600, which are respectively illustrated in flow diagram form in FIG. 5 and FIG. 6. Process 500 starts at point "A," indicated at 502 in FIG. 5. At step 504, mode control section 43 of file microprocessor 40 queries whether file microprocessor 40 has received or is currently receiving a command. If the answer to the step 504 query is "yes," process 500 proceeds to step 506 where mode control section 43 queries spindle control program 31 of servo processor 30 via line 58 to determine whether spindle motor 16 is at full speed. If the answer to the step 506 query is "no," process 500 proceeds to step 508 where mode control section 43 provides a signal via line 58 to spindle control program 31 to return spindle motor 16 to full operational speed. Once spindle motor 16 has returned to full operation speed, process 500 proceeds to step 510 where the command is processed and flow returns to starting point "A" indicated at 502.

If the answer to the step 504 query is "no" or if the answer to the step 506 query is "yes," process 500 proceeds to step 512 where mode control section 43 queries whether file microprocessor 40 has received a command within a first time period (N). If the answer to the step 512 query is "yes," process 500 proceeds to step 510 to process the command and then return to starting point "A" indicated at 502. If the answer to the step 512 query is "no," process 500 proceeds to step 514 where mode control section 43 provides a first control signal via line 57 to power-save idle program 33, which in turn signals spindle control program 31 to reduce current to spindle motor 16 to thereby reduce the disk 15 rotational speed to a first reduced disk rotational speed (RPM1).

After reducing the disk rotational speed in step 514, process 500 proceeds to step 516 to determine a first radial velocity idle sweep profile to apply to VCM 10 at the first reduced disk rotational speed RPM1. Process 600 illustrated in FIG. 6 is employed to select the proper idle sweep profile as described below. Once the proper radial velocity idle sweep profile has been determined by process 600, step 516 retrieves the first idle sweep profile from a first look-up table 518 contained in memory. Once the first idle sweep profile is retrieved, process 500 proceeds to step 520 to apply a varying current level to VCM 10 that produces the optimal transducer head 13 idle sweep profile associated with reduced disk rotational speed RPM1.

At step 522, mode control section 43 queries whether file microprocessor 40 has received a command in a second time period (M). If the answer to the step 522 query is "yes," process 500 proceeds to point "B" to thereby proceed to step 508 to return spindle motor 16 to full operational speed. If the answer to the step 522 query is "no," process 500 proceeds to step 524 where mode control section 43 provides a second control signal via line 57 to power save idle program 33, which in turn signals spindle control program 31 to reduce the current supplied to spindle motor 16 via line 59 to thereby reduce the disk 15 rotational speed to a second reduced disk rotational speed RPM2.

After reducing the disk rotational speed in step 524, process 500 proceeds to step 526 to determine a second radial velocity idle sweep profile to apply to VCM 10 at the second reduced disk rotational speed RPM2. Process 600 illustrated in FIG. 6 is employed to select the proper idle sweep profile as described below. Once the proper radial velocity idle sweep profile has been determined by process 600, step 526 retrieves the second idle sweep profile from a second look-up table 528 contained in memory. Once the second idle sweep profile is retrieved, process 500 proceeds to step 530 to apply a varying current level to VCM 10 that produces the optimal transducer head 13 idle sweep profile associated with reduced disk rotational speed RPM2.

During the idle sweep profile 2 process 500 performs step 532 where mode control section 43 queries whether file microprocessor 40 has received a command. If the answer to the step 532 query is "yes," process 500 proceeds to point "B" to thereby proceed to step 508 and return spindle motor 16 to full operational speed. If the answer to the step 532 query is "no," process 500 performs step 534 to maintain the application of the second idle sweep profile to VCM 10 and continues to perform step 532 to determine whether microprocessor 40 has received a command.

One consequence of reducing the rotational speed of disks 15 is that it precludes the use of any disk-embedded servo system to enable VCM actuator control program 32 to determine the radial location of transducer heads 13. However, in order to select the proper transducer head radial velocity idle sweep profile to apply at a given disk 15 rotational speed, the radial position of the transducer heads 13 must be known, or at least approximated.

Process 600 illustrated in FIG. 6 demonstrates one embodiment of a method for ascertaining the radial position of transducer heads 13 when the rotational speed of disks 16 is reduced and for selecting the proper idle sweep profile. Prior to reducing the rotational speed of disk 15 to either RPM1 or RPM2, the transducer heads 13 should be placed on the load/unload ramp at the disk 15's outer diameter. Thus, at step 602, process 600 assumes that the transducer heads 13 are on the load/unload ramp at the disk's outer diameter.

At step 604, the transducer heads 13 are loaded with the disk moving at the lower RPM level and a read signal is detected. At step 606, a known current level $I_{A1}$ is applied on line 55 to the to VCM 10 and the time required for the transducer heads 13 to reach the inner disk diameter crash stop (ID CS) is measured.

At step 608, a first estimated average radial velocity component of the transducer heads 13 is computed based on the time required for the transducer heads to reach the IDCS measured in step 606 and further based on the assumption that the transducer head acceleration was constant in reaching the IDCS. A rough estimate of the data band width is known based on the particular design of disk drive 9. For example, if a particular disk drive design has an inner diameter radius of approximately X millimeters and an outer diameter radius of approximately Y millimeters, an expected data band width for the disk drive is Y−X=Z millimeters. Dividing the width of the data band (e.g., Z millimeters) by the time required to traverse it, as measured in step 606, provides an estimate of the first average radial velocity component of transducer heads 13 at current level $I_{A1}$.

At step 610, the estimated first average radial velocity component of the transducer heads 13 is compared to a desired average radial velocity component for the transducer heads associated with disk 15 rotating at RPM1. If the first average velocity of the transducer heads is lower or higher than the desired average velocity for the transducer heads, current level $I_{A1}$ is corrected by slightly increasing or decreasing the current level, respectively, to a current level $I_{A2}$. At step 610, reversed and corrected current level $I_{A2}$ is then applied to VCM 10 and the time required for transducer heads 13 to reach the disk's outer diameter is measured. The read signal from transducer heads 13 disappears when the transducer heads reach the outer diameter. At step 612, a second average radial velocity component of the transducer heads 13 is estimated by dividing the estimated data band width by the time to reach the outer diameter measured in step 610.

At step 614, the estimated second average velocity of the transducer heads 13 is used to select an idle sweep profile from a look-up table in memory, such as look-up tables 518 and 528. As noted earlier, each idle sweep profile has an average radial velocity component of the transducer heads sweeping between the inner and outer diameters. The idle sweep profile whose average radial velocity component for the transducer heads most closely matches the estimated second average radial velocity component for the transducer heads is the profile that is selected. The selected idle sweep profile is then retrieved and applied to VCM 10, such as by steps 516 and 520 or by steps 526 and 530 of process 500. At step 618, the estimates for average radial velocity component of the transducer heads are periodically refined by returning to step 606 after a certain time period has elapsed to thereby repeat steps 606, 608, 610 and 612 of process 600.

The power-saving idle operations of the disk drive according to the present invention, in addition to conserving energy, reduce the potential for damaging transducer head-disk interference and also reduce the mechanical wear on the transducer heads during power-saving idle periods by maintaining the transducer heads in a constant sweeping motion above the disk surface and by reducing and/or eliminating head travel time above selected disk diameters. Additionally, the power-saving idle technique of the present invention retrieves data more quickly when returning to seek mode from idle mode. Furthermore, the power-saving idle technique of the present invention can be practiced in existing disk drives without modification to the existing servo system.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A disk drive comprising:
   at least one disk having a disk surface;
   at least one transducer head for writing and/or reading data from the disk surface;
   a spindle motor coupled to the disk to rotate the disk;
   a voice coil motor coupled to the transducer head to provide a radial velocity component to the transducer head to radially position the transducer head relative to the disk surface; and
   a programmable controller for performing a power-saving idle operation which controls the spindle motor to reduce spindle motor current to thereby slow disk rotation, and controls the voice coil motor to vary voice coil motor current to thereby continuously move the transducer head radially relative to the disk surface in a repeating sweeping pattern between a selected inner disk diameter and a selected outer disk diameter, wherein the varying voice coil motor current is a function of the transducer head's radial position in relation to the disk surface.

2. The disk drive of claim 1 wherein the programmable controller performs the power-save idle operation which controls the voice coil motor to vary the voice coil motor current to thereby vary the radial velocity component of the transducer head.

3. The disk drive of claim 2 wherein the programmable controller performs the power-save idle operation which controls the voice coil motor to vary the radial velocity component of the transducer head based on a radial velocity idle sweep profile representing a relationship between the radial velocity component of the transducer head and its radial location relative to the disk surface that optimizes head-disk interaction (HDI) when the disk is rotating at a given reduced rotational speed.

4. The disk drive of claim 3 wherein the programmable controller includes memory storing at least one look-up table containing optimal radial velocity idle sweep profiles.

5. The disk drive of claim 2 wherein the programmable controller performs the power-save idle operation which estimates and corrects achieved radial velocity component of the transducer head versus voice coil motor current.

6. The disk drive of claim 1 wherein the programmable controller determines the transducer head's radial position in relation to the disk surface based on sensing when the transducer head reaches the selected inner disk diameter and the selected outer disk diameter.

7. The disk drive of claim 6 wherein the programmable controller senses when the transducer head reaches the selected inner disk diameter based on reaching an inner diameter crash stop.

8. The disk drive of claim 6 wherein the programmable controller senses when the transducer head reaches the selected outer disk diameter based on a read signal from the transducer head disappearing when the transducer head reaches the selected outer disk diameter.

9. The disk drive of claim 1 wherein the selected inner disk diameter is an inner most disk diameter.

10. The disk drive of claim 1 wherein the selected outer disk diameter is an outer most disk diameter.

11. The disk drive of claim 1 wherein the selected inner and outer disk diameters are selected to prevent the transducer head from traversing a disk area where vital data is stored.

12. The disk drive of claim 1 wherein the selected inner and outer disk diameters are selected to prevent the transducer head from traversing disk areas where a flying height of the transducer head from the disk surface is lowest.

13. The disk drive of claim 1 wherein the programmable controller performs the power-save idle operation which controls the spindle motor to slow disk rotation to a first reduced disk rotational speed based on not receiving a command within a first time period.

14. The disk drive of claim 13 wherein the he programmable controller performs the power-save idle operation which controls the spindle motor to further slow disk rotation to a second reduced disk rotational speed based on not receiving a command within a second time period.

15. A method for performing a power-saving idle operation in a disk drive including at least one disk having a disk surface and at least one transducer head for writing and/or reading data from the disk surface, the method comprising:
reducing a rotational speed of the disk; and
continuously moving the transducer head at varying radial velocities relative to the disk surface in a repeating sweeping pattern between a selected inner disk diameter and a selected outer disk diameter, wherein the varying radial velocity components are a function of the transducer head's radial position in relation to the disk surface.

16. The method of claim 15 wherein continuously moving the transducer head at varying radial velocity components relative to the disk surface is performed based on a radial velocity idle sweep profile representing a relationship between the radial velocity component of the transducer head and its radial location relative to the disk surface that optimizes head-disk interaction (HDI) when the disk is rotating at a given reduced rotational speed.

17. The method of claim 16 wherein the method further comprises:
estimating and correcting achieved radial velocity component of the transducer head versus voice coil motor current.

18. The method of claim 15 further comprising:
sensing when the transducer head reaches the selected inner disk diameter based on reaching an inner diameter crash stop; and
sensing when the transducer head reaches the selected outer disk diameter based on a read signal from the transducer head disappearing when the transducer head reaches the selected outer disk diameter.

19. The method of claim 15 further comprising:
selecting the inner and outer disk diameters to prevent the transducer head from traversing a disk area where vital data is stored.

20. The method of claim 15 further comprising:
selecting the inner and outer disk diameters to prevent the transducer head from traversing disk areas where a flying height of the transducer head from the disk surface is lowest.

* * * * *